US005654733A

United States Patent [19]

Chimura et al.

[11] Patent Number: 5,654,733

[45] Date of Patent: Aug. 5, 1997

[54] LIQUID CRYSTAL ELECTROOPTICAL DEVICE

[75] Inventors: Hidehiko Chimura; Jun Koyama, both of Kanagawa, Japan

[73] Assignee: Semiconductor Energy Laboratory Co., Ltd., Kanagawa-ken, Japan

[21] Appl. No.: 565,859

[22] Filed: Dec. 1, 1995

[30] Foreign Application Priority Data

Jan. 26, 1995 [JP] Japan .................................... 7-030117

[51] Int. Cl.$^{6}$ ........................................ G02F 1/13

[52] U.S. Cl. ........................................ 345/96; 345/209

[58] Field of Search .................................. 345/94, 96, 98, 345/99, 100, 103, 87, 90, 92, 93, 209

[56] References Cited

U.S. PATENT DOCUMENTS

| | | | |
|---|---|---|---|
| 4,465,999 | 8/1984 | Tsuzuki et al. | 340/284 |
| 4,842,371 | 6/1989 | Yasuda | 345/103 |
| 5,041,822 | 8/1991 | Hayashi | 340/784 |
| 5,253,091 | 10/1993 | Kimura | 345/103 |
| 5,432,529 | 7/1995 | Azuhata | 345/100 |
| 5,436,747 | 7/1995 | Suzuki | 359/55 |

FOREIGN PATENT DOCUMENTS

| | | | |
|---|---|---|---|
| 287055A | 10/1988 | European Pat. Off. | 345/100 |
| 0287055 | 10/1988 | European Pat. Off. | 345/100 |
| 0007768 | 7/1990 | European Pat. Off. | 345/100 |
| 2089091 | 3/1990 | Japan | 345/94 |
| 467091 | 3/1992 | Japan . | |

*Primary Examiner*—Mark R. Powell

*Assistant Examiner*—Vincent E. Kovalick

*Attorney, Agent, or Firm*—Sixbey, Friedman, Leedom & Ferguson; Gerald J. Ferguson, Jr.; Karlton C. Butts

[57] ABSTRACT

An active matrix liquid crystal electrooptical device consuming only a small amount of electric power without producing flicker. The electrooptical device comprises a plurality of pixels arranged in rows and columns. Each pixel has a switching element. Scanning lines for turning on and off the switching elements and signal lines to which display signals are produced are connected with the pixels. The device further includes plural signal line driver circuits. Each driver circuit produces a display signal to the corresponding signal line. Each display signal exhibits one polarity during one frame period. The polarity of the display signal produced by at least one of the driver circuits is different from the polarity of the display signal produced by the other driver circuit. The polarity is inverted every frame. The signal lines connected with any one of the driver circuits are connected with the pixels which are, in turn, connected with one of the scanning lines.

14 Claims, 8 Drawing Sheets

LIQUID CRYSTAL ELECTROOPTICAL DEVICE

FIELD OF THE INVENTION

The present invention relates to a liquid crystal electrooptical device and, more particularly, to techniques for reducing the electric power consumed to drive a liquid crystal electrooptical device.

BACKGROUND OF THE INVENTION

The structure of a conventional liquid crystal electrooptical device is shown in FIG. 10.

In FIG. 10, the liquid crystal electrooptical device, indicated by numeral 1001, consists principally of a signal line driver portion 1015, a gate driver portion 1016, and an m×n pixel matrix 1005 (pixels arranged in m rows and n columns).

The signal line driver portion 1015 is composed of source-side shift registers 1002 and a sample-and-hold circuit 1003 for sampling a video signal. The shift registers 1002 are made from complementary TFTs. Similarly, the sample-and-hold circuit 1003 is made of complementary TFTs.

The gate driver portion 1016 is composed of gate-side shift registers 1006 and a buffer circuit 1007. The shift registers 1006 are made of complementary TFTs. Similarly, the buffer circuit 1007 consists of complementary TFTs.

The pixel matrix portion 1005 comprises the pixels 1004 arranged in rows and columns on a plane.

FIG. 2 shows the circuit configuration of each pixel. Each pixel is composed of an N-channel TFT (thin-film transistor) 200, a liquid crystal element 204, and an auxiliary capacitor 206.

The N-channel TFT 200 has a drain electrode 203 to which the liquid crystal element 204 and the auxiliary capacitor 206 are connected. A counter electrode 205 is connected with the side of the liquid-crystal element opposite to the drain. The electrode 207 of the auxiliary capacitor on the opposite side of the drain is grounded.

Referring back to FIG. 10, the pixel matrix 1005 includes the individual pixels 1004. Source signal lines or signal lines 1009 are each connected with the source electrode 201 shown in FIG. 2. Gate signal lines or scanning lines 1008 are each connected with the gate electrode 202 shown in FIG. 2.

The arrangement of the pixels in the pixel matrix 1005 is described now. M source signal lines 1009 extend vertically and are connected with the signal line driver 1015. The source electrodes 201 of the individual TFTs of the n pixels 1004 are connected with the source signal lines, respectively.

N scanning lines 1008 extend horizontally. The gate electrodes 202 of the individual TFTs of the m pixels 1004 are connected with the gate signal lines 1008, respectively.

In the signal line driver circuit 1015, a source signal (display signal) start signal line 1010 and a source line-side (signal line-side) shift clock 1011 are connected as external terminals with the source line-side (signal line-side) shift registers 1002. An image data signal line 1012 is connected as an external terminal with the sample-and-hold circuit.

The operation of the conventional structure is next described.

First, an operation for activating pixels connected with one gate signal line (scanning line) is described.

The i-th line in the vertical direction (hereinafter referred to as the i-th line) is discussed. When the gate signal line (scanning line) 1008 on the i-th line goes high, the gate electrodes 202 of all the pixels 1004 on the i-th line are activated. An electrical conduction occurs between the source 201 and the drain 203 of each of all the TFTs 200 on the i-th line.

In response to both signal line start signal 1010 and source-side shift clock 1011, the sample-and-hold circuit samples a video signal, or a sampled signal 1017, from the left end of the i-th line. The display signal is written to the successive pixels. Thus, writing for one line is completed.

An operation for displaying one frame of image is described below.

A gate start signal 1013 and a gate-side shift clock 1014 make the gate signal on the vertically top line go high. This signal is shifted downward by the gate-side shift clock 1014.

The above-described principle of operation for 1 line is executed when the gate signal of each line is high (H). In this way, one frame of image is displayed.

The state of the polarity of the display signal for one frame of image is shown in FIG. 3.

When one frame of image is displayed, in order to prevent flicker, the polarity of the source signal (display signal) supplied from the source signal line 1009 is inverted between adjacent lines, i.e., between the i-th line and the (i+1)th line, as shown in FIG. 3. This is referred to as line inversion. In other words, the polarity of the display signal for the odd-numbered ((2i−1)th) line is opposite to the polarity of the even-numbered (2i–th) line.

This is accomplished by supplying the image data signal applied from the image data signal line 1012 in such a way that the polarity is inverted from one line to an adjacent line.

With respect to one line, the polarity is inverted every frame to prevent the liquid crystal from deteriorating.

The input image data used by the conventional device is shown in FIG. 11.

The present invention is intended to provide techniques for reducing the electric power consumed by a liquid crystal electrooptical device when it is in operation. The problems with the conventional device are next described.

To prevent the liquid crystal electrooptical device from producing flicker, the polarity of the image data signal is inverted from line to line, as described in connection with the conventional structure and operation.

However, the electric power consumed when the liquid crystal electrooptical device is operated is increased by the fact that the image data signal is inverted between adjacent lines.

The image data signal is inverted between adjacent lines. This increases the amount of electric power consumed by the liquid crystal electrooptical device. This is briefly described by referring to FIGS. 10 and 2.

Referring to FIG. 2, Let Con be the pixel capacitance when the N-type TFT 200 is conducting. Let Coff be the pixel capacitance when the N-type TFT 200 is cutoff. Referring to FIG. 10, let Cl be the capacitance of one vertically extending source signal line 1009 of the liquid crystal electrooptical device 1001. Let V be the voltage for activating one liquid crystal element. The voltage on the positive polarity side is V/2. The voltage on the negative polarity side is V/2. Let Fl be the number of line inversions. It is assumed that an m×n matrix structure is formed. In order to activate one source signal line 1009 extending vertically, electric power given by $$Wl=(Cl+Con+Coff+(n-1))\times V\times V\times Fl \quad (A)$$

is required. Therefore, an electric power $W_1$ given by $$W_1=m\times Wl \quad (B)$$

is necessary to display one frame of image.

The problem is that the device is driven with line inversion. Since the number of line inversions Fl is substantially equal to the number of lines, i.e., the gate signal lines (scanning lines). Therefore, for a general display device, about 400 to 500 line inversions take place per frame of image.

If no line inversion is done, the electric power consumption accompanying inversion of the polarity of the display signal occurs only when the polarity is inverted every frame in order to prevent deterioration of the liquid crystal. That is, the electric power is consumed whenever the frame is inverted, i.e., every frame of image. Letting Ff be the number of frame inversions, the total electric power consumed during display is given by $$W_a=(Cl+Con+Coff\times(n-1))\times V\times V\times m\times Ff \quad (C)$$

The electric power consumed during one frame is given when Ff=1 in the Eq. (C). Accordingly, if only frame inversion is done, the amount of electric power consumed by the pixel matrix portion is reduced by a factor equal to the line inversion number compared with the case in which line inversions are done. Hence, the amount of electric power can be decreased greatly.

Furthermore, the amounts of electric power consumed by the sample-and-hold circuit, an analog buffer circuit, and other circuits of the driver circuit portion can be reduced greatly as well as the electric power consumed by the pixel matrix portion, by not adopting the line inversion method.

However, if the line inversion method is not executed, and if only the frame inversion method is conducted (i.e., the polarity of the display signal is inverted every frame), then flicker is produced. This deteriorates the image quality severely.

Another method of decreasing the amount of electric power consumed is to reduce the amounts of electric power consumed by the source-side shift registers 1001, by the gate-side shift registers 1006, and by the gate electrode-side buffer 1007. However, the amount of reduction achieved is small compared with the total amount of electric power consumed.

In the Eq. (A) above, only the interconnect capacitance is taken into account. A further method of reducing the interconnect capacitance is to thin the interconnects.

However, if the interconnects are thinned, the interconnect resistance is increased. Furthermore, the design rules impose limitations on this method.

If the interconnects are made thicker to reduce the interconnect resistance, the interconnect capacitance is increased. Moreover, the pixel spacing is increased. This lowers the aperture ratio, thus adversely affecting the image quality.

As can be readily understood from the Eq. (A), the simplest efficient method for reducing electric power consumed is to lower the driving voltage V. However, where good image quality and display speed are also taken into consideration, it cannot be said that this is a practical method.

SUMMARY OF THE INVENTION

It is an object of the present invention to provide a liquid crystal electrooptical device which achieves low electric power consumption while maintaining high image quality.

One embodiment of the present invention which achieves the above-described object is an active matrix liquid crystal electrooptical device having a plurality of pixels arranged in rows and columns, the pixels having switching elements. This electrooptical device comprises: scanning lines connected with their respective ones of said pixels for turning on and off said switching elements; signal lines to which display signals are transmitted and which are connected with their respective ones of said pixels; and a plurality of signal line driver circuits. Each of said signal line driver circuits produces a display signal of one polarity to a corresponding one of the signal lines, the polarity being maintained during one frame period. The polarity of the display signal produced by at least one of the driver circuits is different from the polarity of the display signal produced by the other driver circuit or circuits. The polarities are inverted every frame. The pixels connected with one of the scanning lines are connected with the signal lines which are, in turn, connected with any one of the driver circuits.

Another embodiment of the invention is a liquid crystal electrooptical device having a plurality of pixels arranged in rows and columns, the pixels having switching elements. This electrooptical device comprises: scanning lines connected with their respective ones of said pixels for turning on and off said switching elements, said scanning lines including n-th and (2n−1)th scanning lines (n is a natural number); signal lines to which display signals are transmitted and which are connected with their respective ones of said pixels; and two signal line driver circuits for producing their respective display signals of different polarities. Each display signal has one polarity which is maintained during one frame period. The polarities are inverted every frame. First signal lines are included in the signal lines and connected with one of the signal line driver circuits. The first signal lines are connected with the pixels connected with the n-th scanning line. Second signal lines are included in the signal lines and connected with another of the signal line driver circuits. The second signal lines are connected with the pixels connected with the (2n−1)th scanning line.

Because of the above-described structures, the liquid crystal electrooptical device is prevented from producing flicker. Also, the amount of electric power consumed can be reduced.

That is, in the present invention, a plurality of signal line driver circuits are used. The polarity of the display signal produced from each driver circuit is not inverted during one frame period.

Instead, the signal line driver circuits connected with the adjacent lines are made different.

For example, two signal line driver circuits are employed. Each of these driver circuits is connected with one odd- or even-numbered line.

Since the two signal line driver circuits have polarities opposite to each other, the signals on the adjacent lines in the pixel matrix have opposite polarities at all times. It substantially follows that line inversions are produced. Hence, flicker can be prevented.

Furthermore, in each signal line driver circuit, the polarity of the display signal does not vary during one frame. Therefore, consumption of electric power which would otherwise be caused by line inversions does not take place. As a result, the amount of electric power consumed can be reduced by two orders of magnitude compared with the prior art device.

Moreover, the liquid crystal is prevented from deteriorating by inverting the polarities of the display signals every frame, the signals coming from the two signal line driver circuits.

Any adjacent lines may be connected with different signal line driver circuits. Alternatively, every plural lines may be connected with different signal line driver circuits.

Furthermore, pixels lying on the same line may be connected with different signal line driver circuits. The number of the signal line driver circuits is arbitrary.

Selector circuits are provided to assign externally applied image data and control signals between image data input signal lines and control signal input lines connected with the signal line driver circuits. In consequence, the liquid crystal electrooptical device can be driven without inducing flicker and without the need to modify the prior structure of externally applied input signals. Furthermore, the amount of electric power consumed can be reduced.

In another feature of the invention, selector circuits for assigning image data corresponding to any one of the signal line driver circuits to image data input signal lines corresponding to the signal line driver circuits in synchronism with a vertical synchronizing signal are provided, the image data being included in image data applied from the outside.

In a yet other feature of the invention, selector circuits are provided which select the display signal coming from any one signal line driver circuit out of the display signals produced from the signal line driver circuits and which send the selected signal to the signal lines in synchronism with a vertical synchronizing signal. In this way, the number of the signal lines can be made coincident with that of the prior art device. Consequently, widening of the pixel spacing and concomitant image quality deterioration can be prevented.

In the present invention, each of the selector and driver circuits may be composed of complementary TFTs, P-type TFTs, or N-type TFTs.

Each of the switching elements of the pixels may be complementary TFTs, P-type TFTs, N-type TPTs, or thin-film diode such as MIM (metal-insulator-metal), NIN, PIP, PIN, or NIP.

Other objects and features of the invention will appear in the course of the description thereof, which follows.

DETAILED DESCRIPTION OF THE INVENTION

EXAMPLE 1

Examples of the present invention are next described in detail with reference to the drawings.

Figure 1:
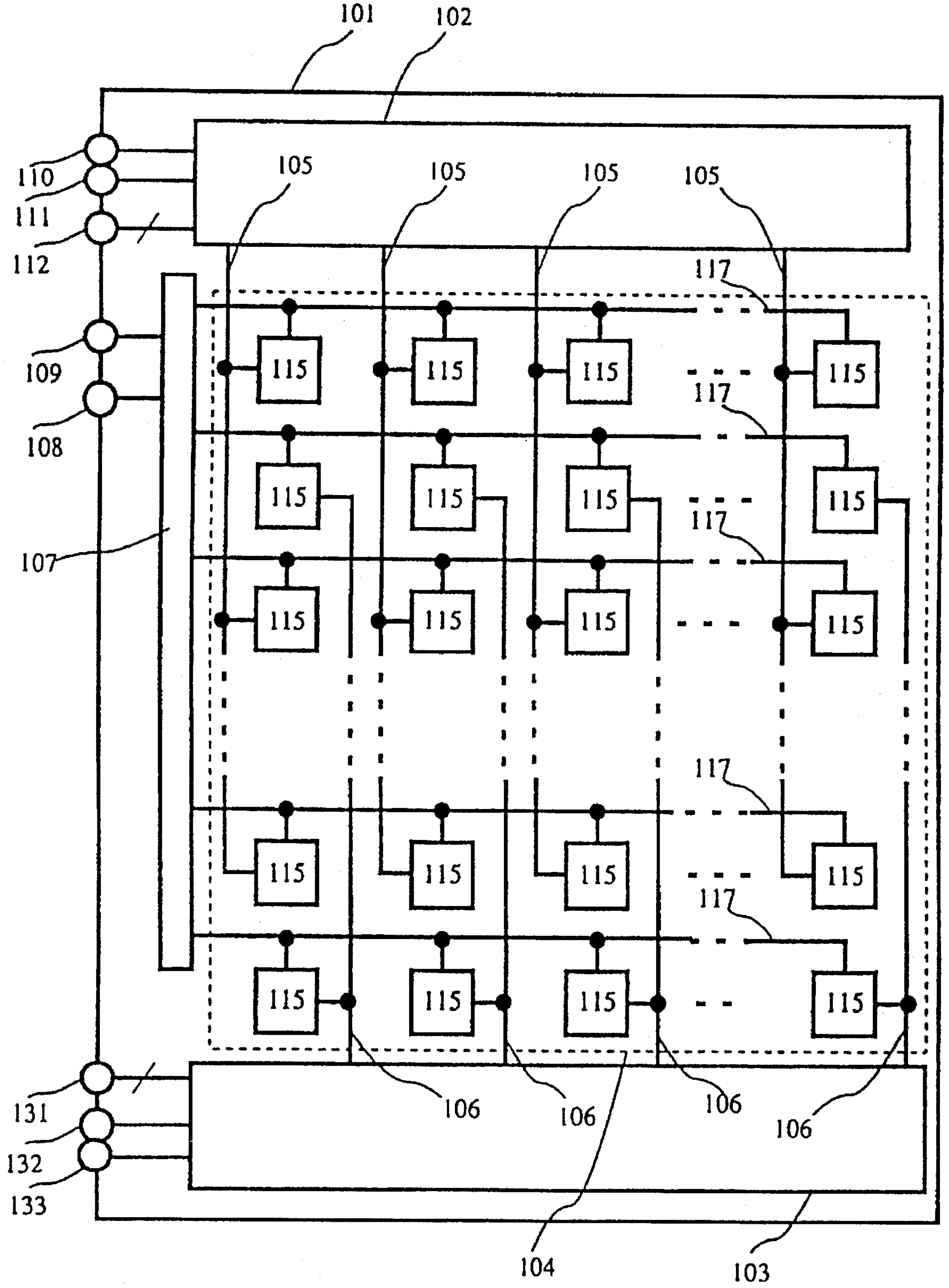
FIG. 1 is a diagram of a liquid crystal electrooptical device of Example 1.

FIG. 1 shows the structure of a liquid crystal electrooptical device of Example 1.

First, the structure is described. Example 1 comprises an m×n pixel matrix. For convenience of preparation of the drawings, it is assumed that m and n are even numbers: However, even if m and n assume any arbitrary combination of odd numbers and even numbers, the present invention can be practiced without difficulty.

In the same way as the prior art device, a liquid crystal display 101 consists mainly of signal line driver portions 102, 103, a gate driver portion 107, and a pixel matrix portion 104. Each of the signal line driver portions 102 and 103 is made up of complementary TFTs, N-type TFTs, or P-type TFTs. The gate driver portion 107 is composed of complementary TFTs, N-type TFTs, or P-type TFTs.

Figure 2:
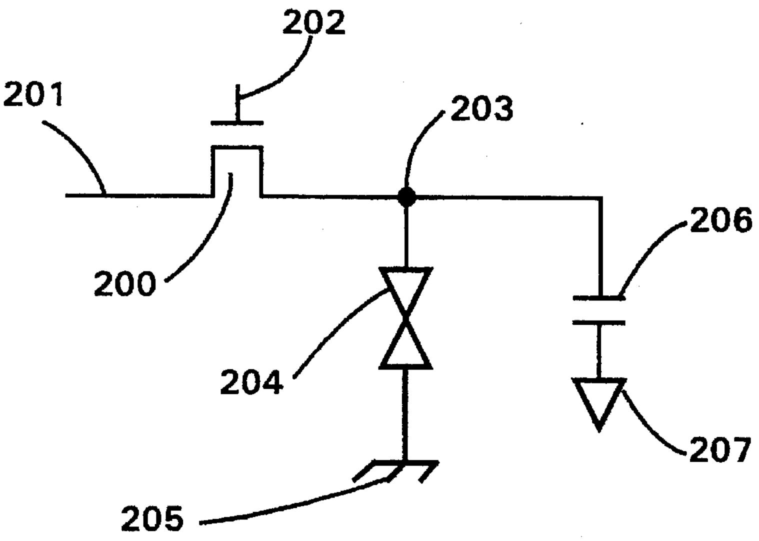
FIG. 2 is a circuit diagram of each pixel.
Figure 3:
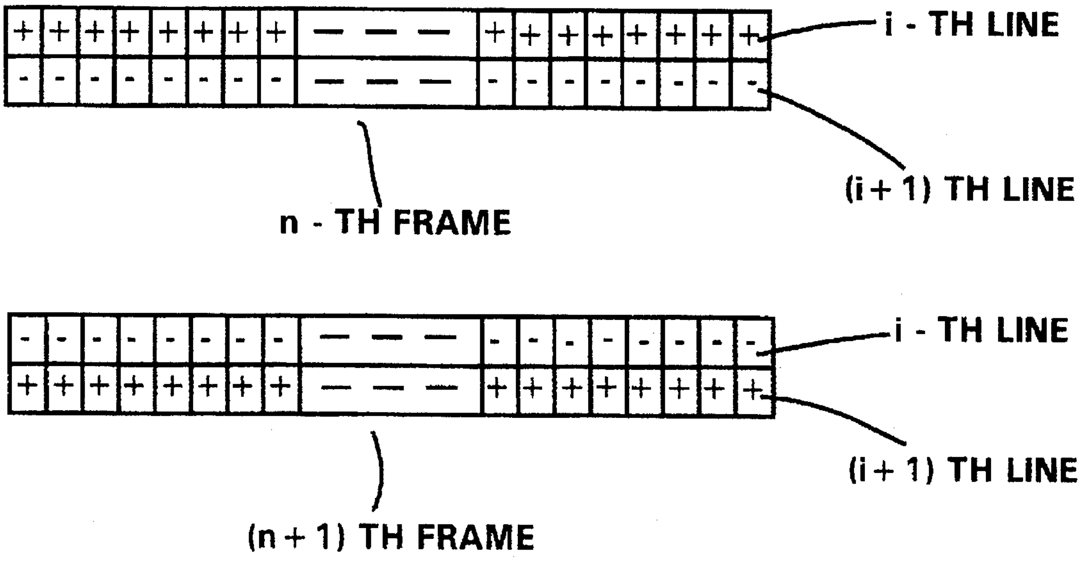
FIG. 3 is a diagram illustrating the polarities of display signals for one frame of image.

The pixel matrix portion 104 consists of pixels 115 arranged in rows and columns on a plane. Each pixel 115 comprises a TFT, a liquid crystal element, and an auxiliary capacitor, in the same way as in the prior art device shown in FIG. 2.

The gate driver portion 107 is composed of shift registers and a buffer circuit. A gate start signal input terminal 108 and a gate clock signal input terminal are connected to the input of the gate driver portion 107. N gate signal lines 117 extending horizontally are connected to the output of the driver portion 107. The gate electrodes of the m pixels 115 are connected with each one of the gate signal lines 117. However, the source line signal lines 105 and 106 widely differ in configuration from those of the prior art device.

There exist two separate signal line driver portions, i.e., the signal line driver portions 102 and 103. The top signal line driver 102 is hereinafter referred to as the O driver. The bottom signal line driver 103 is hereinafter referred to as the E driver.

In order to activate the odd-numbered lines, the start signal input terminal 110, the shift clock signal input terminal 111, and the image data input terminal 112 are connected with the input of the O driver 102. M source signal lines (hereinafter referred to as the O source signal lines) 105 are connected with the output of the O driver 102. The O source signal lines 105 are connected with the source electrodes of the pixels 115 on the odd-numbered horizontal lines (1, 3, . . . (counted from the top)). The number of these connected lines is only n/2.

On the other hand, a start signal input terminal 131, a shift clock signal input terminal 132, and an image data input terminal 133 are connected with the input of the E driver 103 in order to activate the even-numbered lines. M source signal lines (hereinafter referred to as the E source signal lines) 106 are connected with the output of the E driver 103. The E source signal lines 106 are connected with the source electrodes of the pixels of only the even-numbered horizontal lines (2, 4, . . . (counted from the top)). The number of these connected lines is n/2.

The operation of Example 1 is described next. The operation for displaying one line is the same as the operation of the prior art device and so description of this operation is omitted.

An operation for displaying one frame of image is next described.

First, a display signal is written to the first line. This display signal is supplied from the O driver 102. It is assumed that the polarity of the display signal is (+).

Then, the display signal is written to the second line. This display signal is supplied from the E driver 103 at this time. The polarity of the display signal is (−).

Similarly, when the display signal is written to an odd-numbered line, the display signal is supplied from the O driver 102. The polarity of the display signal supplied from the O driver 102 is maintained constant ((+) in this frame of image).

Similarly, when the display signal is written to an even-numbered line, the display signal is supplied from the E driver 103. The polarity of the display signal supplied from the E driver 103 is maintained constant ((–) in this frame of image). In this way, all the n lines are written, thus completing display of one frame of image.

The operation for each frame of image is described below.

During some frame of image, the display signal is supplied from the O driver 102 when an odd-numbered line is written. Furthermore, the polarity of the display signal supplied from the O driver 102 at this time is maintained at (+).

When an even-numbered line is written, the display signal is supplied from the E driver 103. Furthermore, the polarity of the display signal supplied from the E driver 103 is maintained at (–).

During the next frame, the polarity is maintained at the polarity opposite to the polarity assumed in the previous frame.

In particular, when an odd-numbered line is written, the display signal is supplied from the O driver 102. Furthermore, the polarity (–) of the display signal supplied from the O driver 102 is opposite to the polarity assumed in the previous frame. On the other hand, when an even-numbere d line is written, the display signal is supplied from the E driver. Furthermore, the polarity (+) of the display signal supplied from the E driver is maintained opposite to the polarity assumed during the previous frame. These operations are repeated.

The electric power consumed is next discussed.

In the driving method of Example 1, on one vertical source signal line, the voltage applied to each horizontal pixel is inverted every frame on each of the odd- and even-numbered lines.

In the same way as the foregoing description, let Con be the pixel capacitance when the TFT is conducting. Let Coff be the pixel capacitance when the TFT is cutoff. Let Cl be the capacitance of the source signal lines 105 and 106. Let V be the voltage for activating one liquid crystal element. Let Ff be the number of frame inversions. The amount of electric power Wo consumed by the O driver and the amount of electric power We consumed by the E driver can be represented as follows.

$$Wo=(Cl+Coff\times((n/2)-1)+Con)\times V\times V\times Ff$$

$$We=(Cl+Coff\times((n/2)-1)+Con)\times V\times V\times Ff$$

Consequently, the total amount of electric power consumed is given by $$W=(Wo+We)\times m$$

In the present example, line inversions are not utilized and so electric power consumption which would otherwise be caused by line inversions is prevented. Hence, the amount of electric power consumed can be made much lower than the amount of electric power consumed by the prior art liquid crystal electrooptical device.

Furthermore, in a display within one frame of image, the polarity is inverted from line to line. In consequence, flicker can be prevented.

EXAMPLE 2

In Example 1 described in connection with FIG. 1, the image data input terminals are required to include two input terminals (i.e., the image data terminal and the image input terminal) and the two additional terminals (i.e., the start input terminal and the shift clock for shifting it). The image data terminal is input to any even-numbered horizontal line. The image input terminal is input to any even-numbere d horizontal line.

Preferably, the number of the input terminals is reduced to a minimum. A configuration having the same number of input terminals as the prior art device is described in Example 2. Also, its operation is described.

Figure 6:
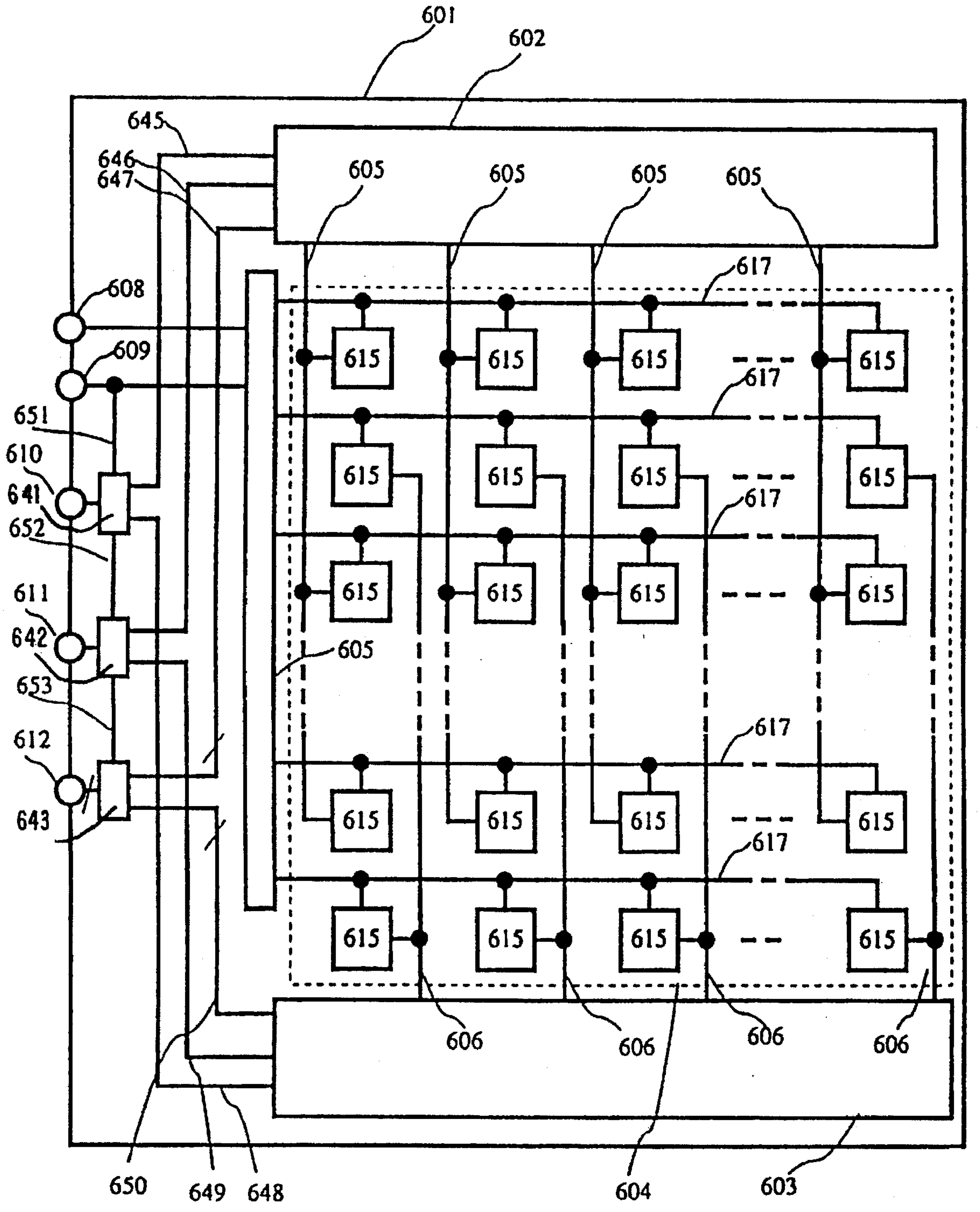
FIG. 6 is a diagram of a liquid crystal electrooptical device of Example 2.

FIG. 6 shows the configuration of the liquid crystal electrooptical device of Example 2.

Figure 10:
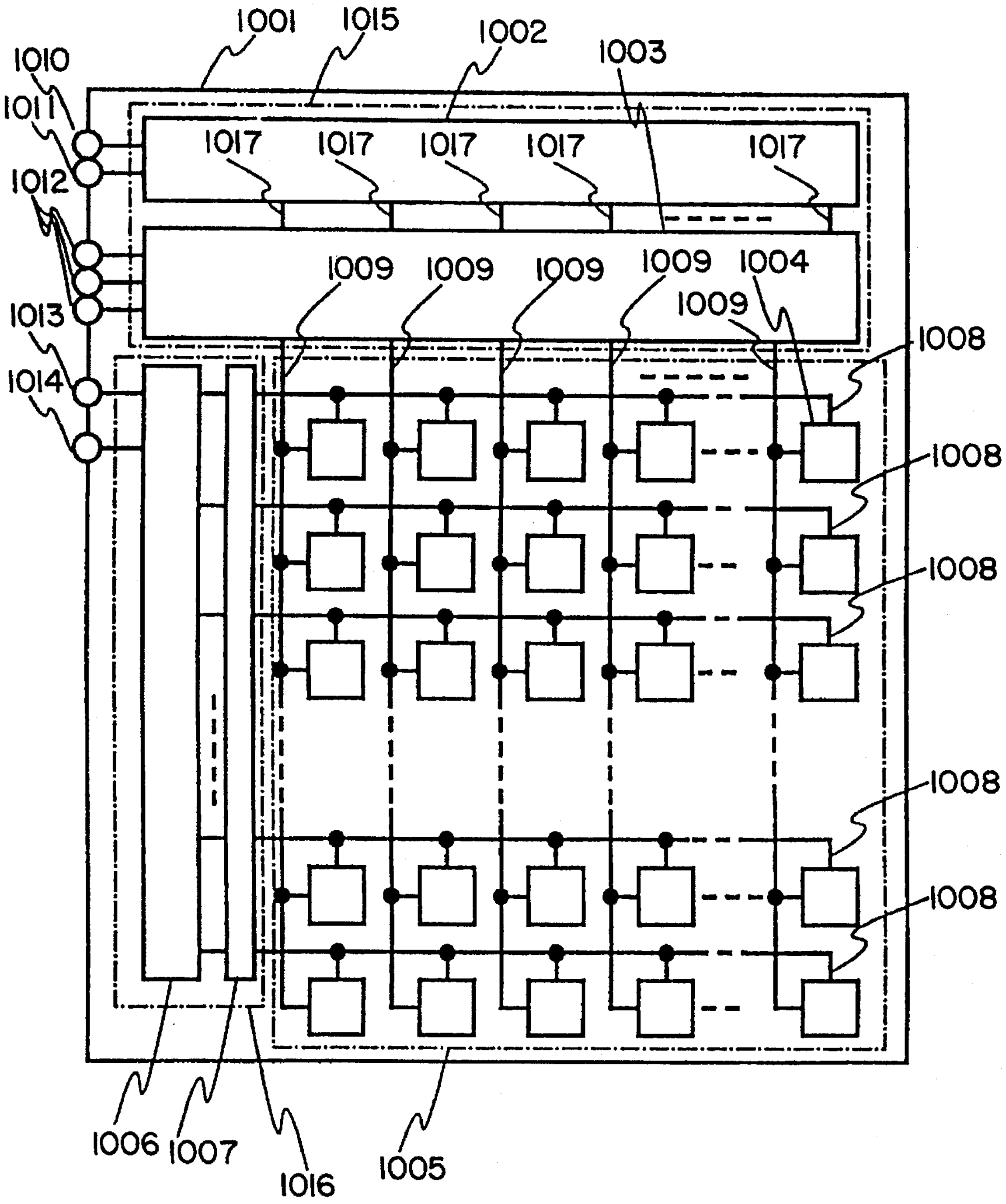
FIG. 10 PRIOR ART
FIG. 10 is a diagram of the prior art liquid crystal electrooptical device.

First, the configuration of Example 2 is described by referring to FIGS. 6, 1, and 10. In FIG. 6, indicated by 601–617 are the same as those indicated by 101–117 in FIG. 1.

Furthermore, the input terminals 131–133 connected with the E driver portion 603 (103) forming a component of Example 1 are omitted.

However, a source-side start signal input terminal 610, a source-side shift clock input terminal 611, an image data input terminal 612, selectors 641, 642, and 643 composed of TFTs, and selector signal lines 651, 652, and 653 are added. Image data and a source-side start pulse are received from control signal input terminals such as the input terminals 610 and 611 and from the image data input terminal 612. The selectors 641–643 act to assign the image data, the start pulse, and the source-side shift clock between the O driver 602 and the E driver 603.

Figure 7:
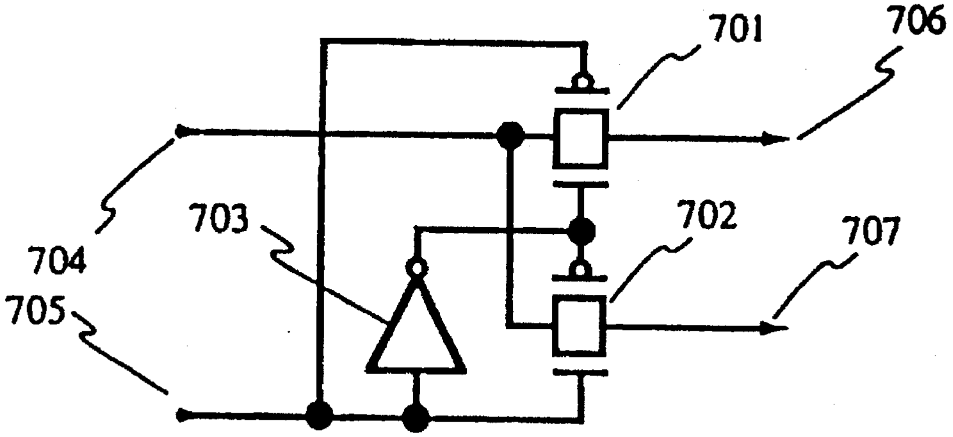
FIG. 7 is a diagram of a selector circuit.
Figure 8:
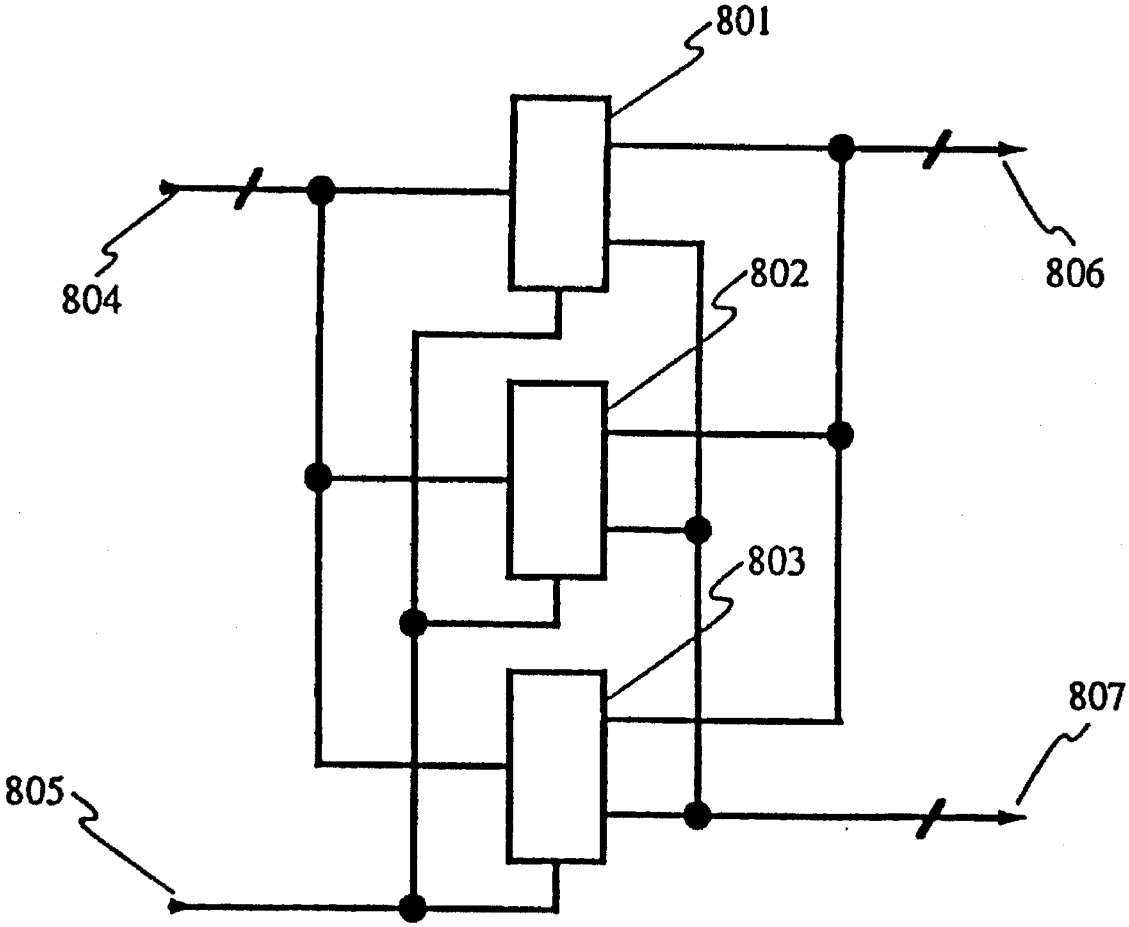
FIG. 8 is a diagram of another selector circuit.

Examples of the configurations of the selectors 641, 642, and 643 made up of TFTs are next described by referring to FIGS. 7 and 8.

FIG. 7 shows the structure of the selector circuits 641 and 642. FIG. 8 shows the structure of the selector circuit 643. Transmission gates 701 and 702 are made of a P-type TFT and an N-type TFT. An inverter circuit 703 is made of a TFT.

These selector circuits 641 and 642 operate in the manner described now. When a selecting signal line 705 is at a low level, a data signal received from a data signal line 704 is sent to 706. When the selecting signal line 705 is at a high level, a data signal received from the data signal line 704 is sent to 707.

The configuration of the selector 643 is described by referring to FIG. 8.

In FIG. 8, selector circuits 801, 802, and 803 are identical in structure with the selector circuits described in connection with FIG. 7. It follows that the selector circuit 643 is composed of the three selector circuits.

A selecting signal line 805 is connected with the selecting signal line 705 shown in FIG. 7. A data signal line 804 is connected with the data signal line 704 shown in FIG. 7. A data output line 806 is connected with the 706 shown in FIG. 7. Another data output line 807 is connected with the 707 shown in FIG. 7.

This selector circuit 643 is designed to select 3-bit data, because ordinary color image data is composed of three primary colors (red, green, and blue).

Where the image data consists of 1-bit data as in the case of a monochrome display, the selector circuit 634 may be made coincident with the selector circuits 641 and 642 in configuration.

Therefore, in the case of 1-bit image data, the selector circuits 641, 642, and 643 can be used instead of the selector circuit 643 shown in FIG. 8.

The operation of the selector shown in FIG. 8 is described.

When the selecting signal line 805 is at a low level, a 3-bit data signal received from the 3-bit data signal line 804 is sent to the 806. When the selecting signal line 805 is at a high level, a data signal received from the data signal line 804 is sent to the 807.

Referring back to FIG. 6, the selecting signals 651, 652, and 653 from the selectors 641, 642, and 643 are all coupled to a gate-side shift clock 609.

Figure 4:
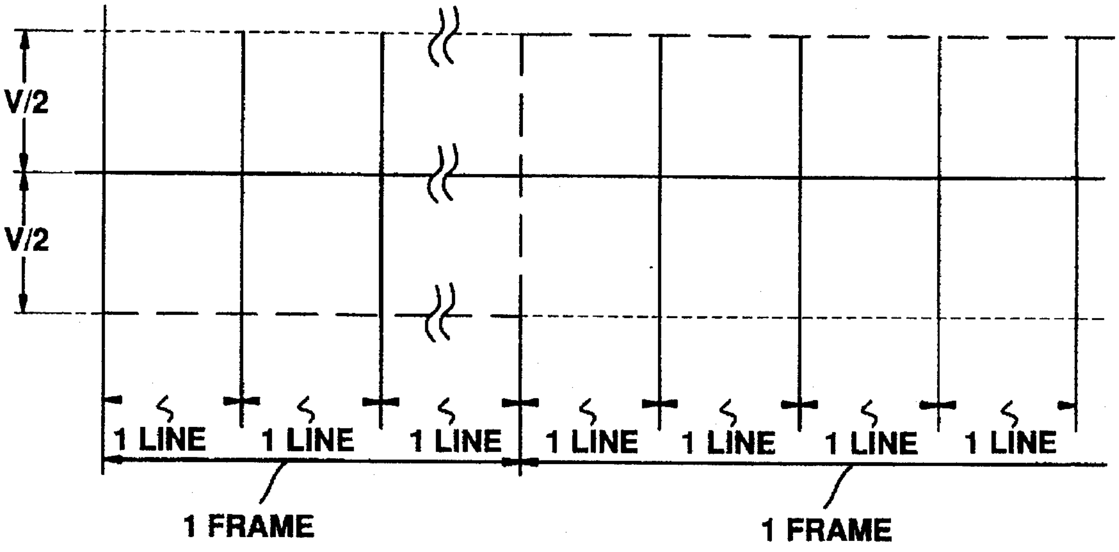
FIG. 4 is a diagram of image data applied to an O driver.
Figure 5:
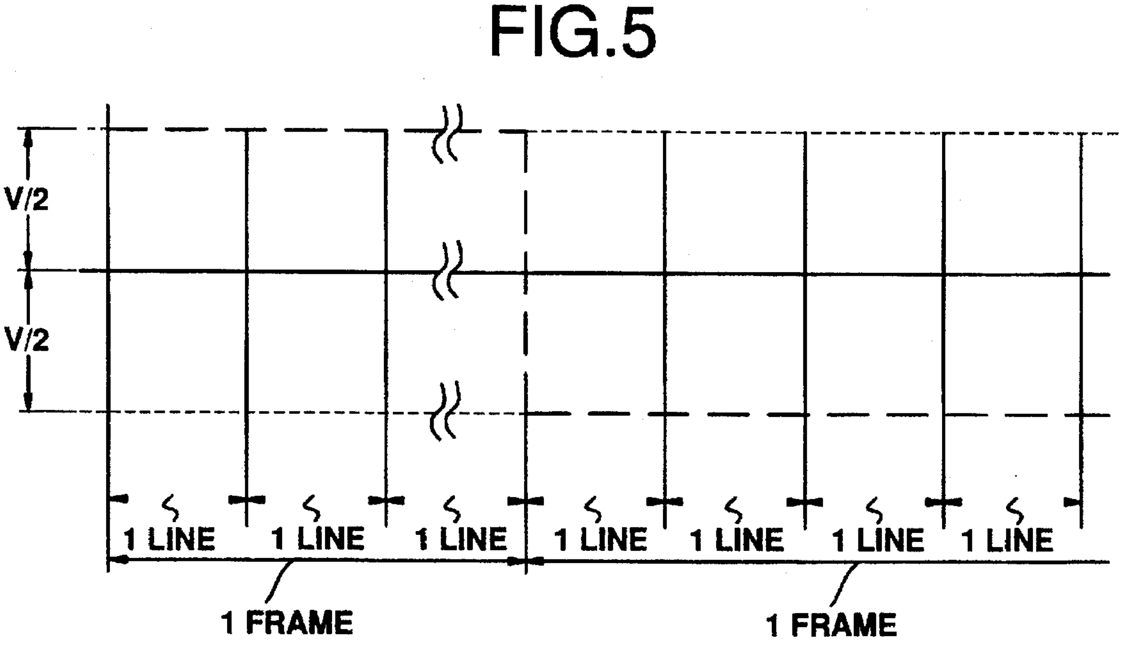
FIG. 5 is a diagram of image data applied to an E driver.
Figure 11:
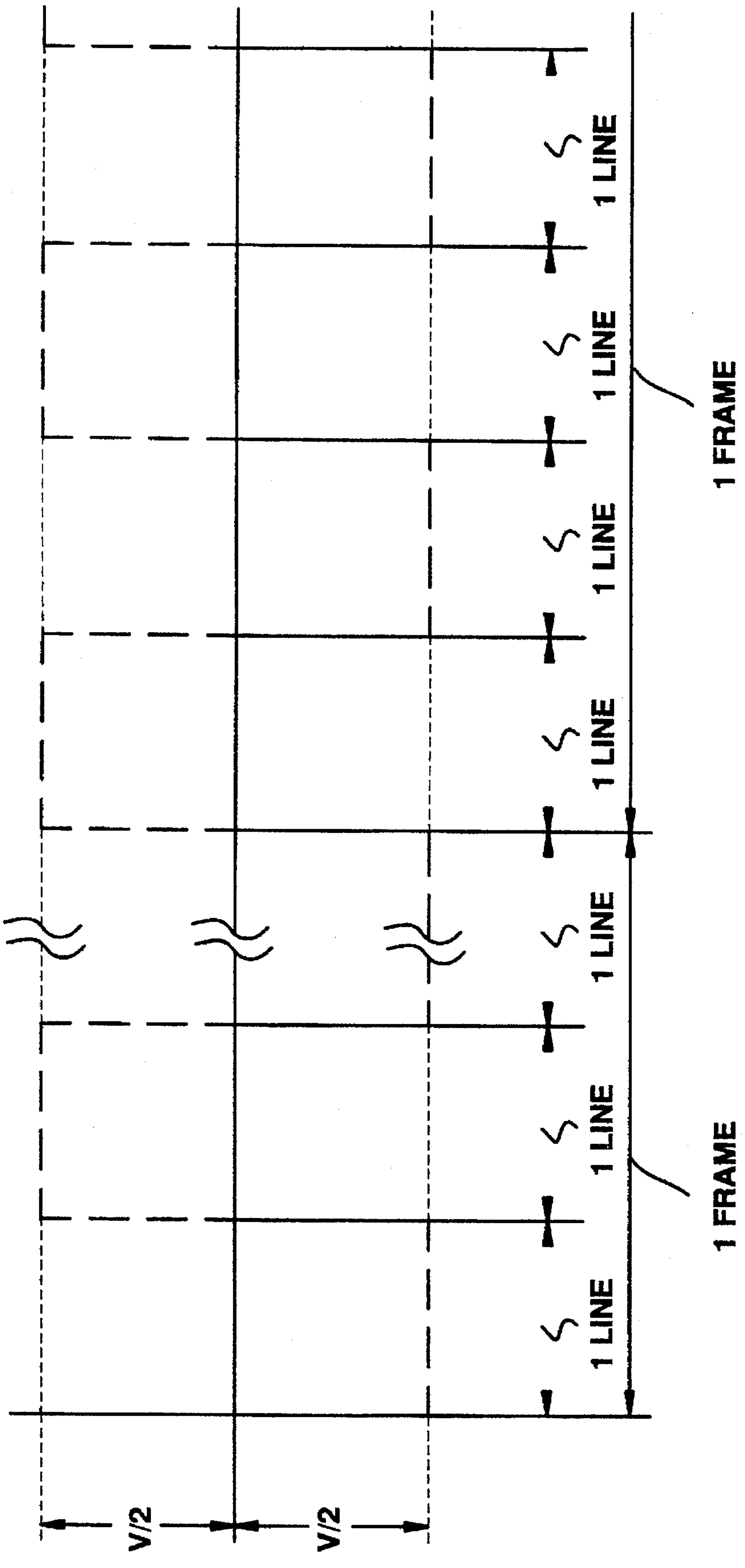
FIG. 11 is a diagram of input image data to the prior art device.

The device is so set up that when the gate-side shift clock is at a high level, the pixels on the odd-numbered horizontal lines are activated, and that when the gate-side shift clock is at a low level, the pixels on the even-numbered horizontal lines are activated. In this way, vertical synchronization can be accomplished. If a driving waveform as shown in FIG. 11 is applied, driving waveforms similar to those of Example 1 shown in FIGS. 4 and 5, respectively, are applied to the O driver 602 and the E driver 603, respectively.

The number of the input terminals is made identical with the number of the input terminals of the prior art device. Using input signals similar to those used by the prior art device, this device can be operated in the same way as in Example 1.

As a result, the amount of electric power consumed can be reduced greatly. Also, flicker can be prevented.

EXAMPLE 3

In each of Examples 1 and 2, two different signal line driver circuits (102, 103 or 602, 603) are provided. Therefore, two signal lines are necessary to transmit source signals to one vertical line.

In these structures, the horizontal pixel spacing is widened and so the displayed image is roughened. This may lead to a deterioration of the image quality.

In Example 3, an example equipped with countermeasures against the above-described deterioration is shown.

Figure 9:
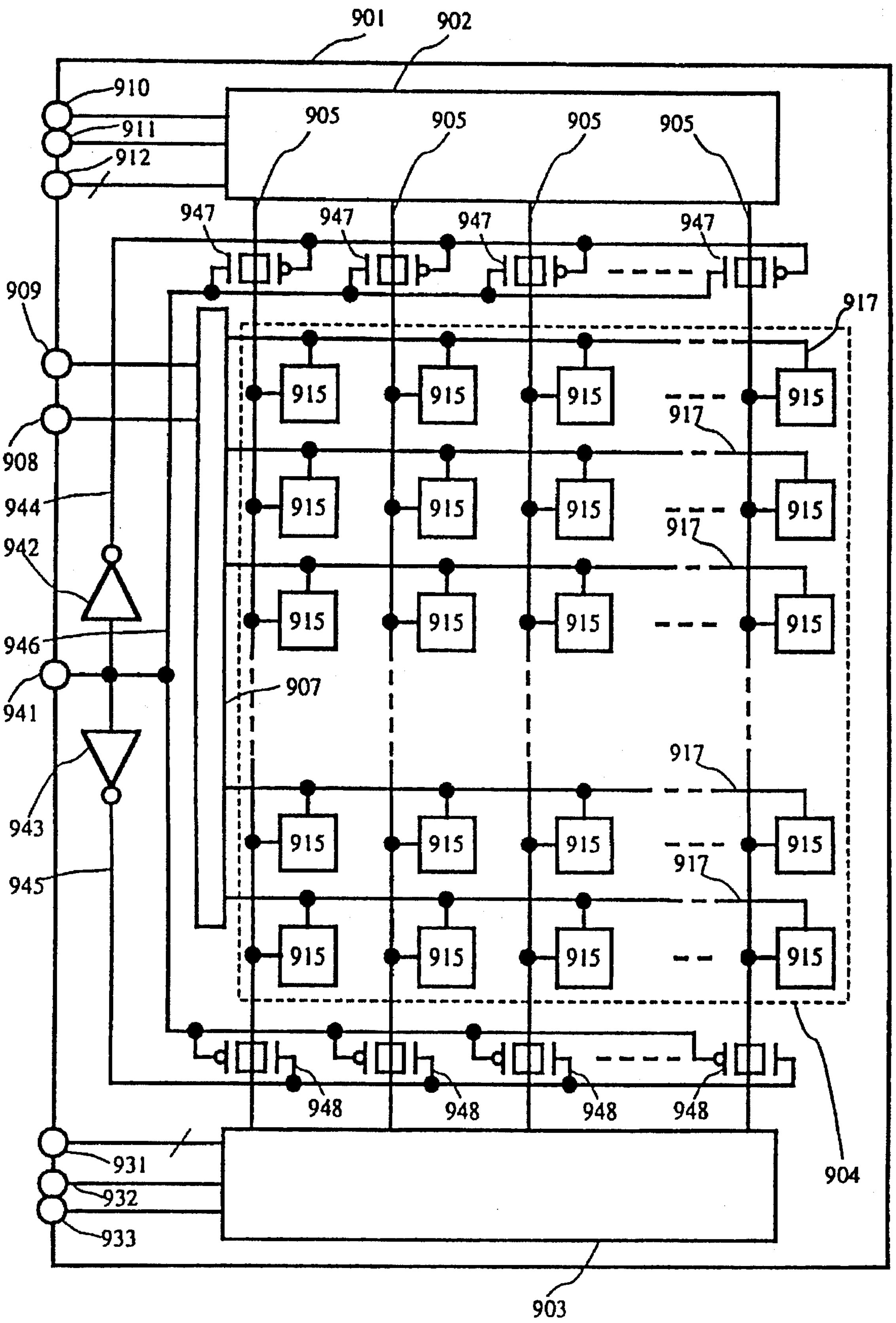
FIG. 9 is a diagram of a liquid crystal electrooptical device of Example 3.

FIG. 9 shows the structure of a liquid crystal electrooptical device of Example 3.

The liquid crystal electrooptical device, indicated by 901, comprises signal line driver portions 902, 903, a gate driver portion 907, and a pixel matrix portion 904.

The pixel matrix portion 904 consists of pixels 915 arranged in rows and column on a plane. Each pixel 915 is composed of a TFT, a liquid crystal element, and an auxiliary capacitor.

A gate start signal input terminal 908 and a gate clock signal input terminal 909 are connected to the input of the gate driver portion 907. N gate signal lines 917 extending horizontally are connected to the output of the gate driver portion 907. The gate electrodes of the m pixels 915 are connected with the gate signal lines 917, respectively.

In order to activate the odd-numbered lines, a start signal input terminal 910, a shift clock signal input terminal 911, and an image data input terminal 912 are connected to the input of the O driver 902. In order to activate the even-numbered lines, a start signal input terminal 931, a shift clock signal input terminal 932, and an image data input terminal 933 are connected to the input of the E driver 903.

The present example differs from Example 1 in two points.

The first difference is that the vertical signal line for driving both O driver 902 and E driver 903 is a single source signal line 905. In Example 1, one signal line is used for each driver, i.e., two source signal lines 105 and 106 are provided.

The second difference is that transmission gates (TG) for enabling the source signal line 905 are interposed between the drivers and the pixel matrix to prevent different signals from conflicting with each other on the source signal line 905, and that an input terminal 941 and inverter circuits 942, 943 are added. A signal for turning on or off the transmission gate is applied to the input terminal 941. The inverter circuits 942 and 943 are made of TFTs connected with the transmission gate.

The transmission gates (TG) 947 and 948 are each made of a TFT. The transmission gate 947 is inserted between the O driver 902 and the pixel matrix 904. The transmission gate 948 is inserted between the E driver 903 and the pixel matrix 904.

The operation is next described. First, the operation of the transmission gates (TG) 947 and 948 inserted between the pixel matrix 904 and the O driver 902 and between the pixel matrix and the E driver 903, respectively, is described.

When the input terminal 941 is at a high level, the signal line 944 on the side of the p-type transistor of the transmission gate 947 is made to go low by the inverter circuit 942 and made to go high by the inverter circuit 943. As a result, the transmission gate 947 is enabled. The source signal from the O driver 902 is transmitted to the source signal line 905 and then to the pixel matrix.

Meanwhile, the transmission gate 948 between the E driver 903 and the pixel matrix 904 is opposite to the transmission gate 947 in signal line connection. Consequently, the transmission gate 948 is disabled. The source signal from the E driver is not transmitted to the pixel matrix.

When the input terminal 941 is at a low level, the operation of the transmission gates 947 and 948 is opposite to the above-described operation. Consequently, the source signal from the E driver 903 is sent to the pixel matrix 904 but the source signal from the O driver 902 is not passed to the pixel matrix.

Accordingly, if a signal (i.e., vertical synchronizing signal) synchronized with the gate clock input terminal 909 is applied from the transmission gate control signal lines, the display signals from the O and E drivers, respectively, can be made to have the same polarity, though only one vertical signal line is present for each driver.

In the present example, display signals from the two drivers are transmitted via a common signal line. Therefore, the amount of electric power consumed by the capacitances of the signal lines and so on is considerably larger than the amounts of electric power consumed in Examples 1 and 2. However, in each driver circuit, the amount of electric power consumed by line inversions can be reduced. In consequence, the amount of electric power consumed can be made much lower than the amount of electric power consumed by the prior art device.

In Examples 1–3, the O driver and the E driver are spaced from each other vertically. No limitations are imposed on their positions. That is, both O and E drivers may be mounted on the same side on the same display device.

The present invention provides a liquid crystal electrooptical device which is free from flicker and achieves a great saving in electric power consumption.

What is claimed is:

1. A liquid crystal electrooptical device comprising:

a plurality of pixels arranged in rows and columns, said pixels having switching devices;

a plurality of signal line driver circuits connected with signal lines for supplying image signals into said pixels; each signal line being connected to each of said pixels in a column, a scanning line driver circuit connected with scanning lines for supplying signals for turning on and off said switching devices;

controlling means for controlling supply of image signals from said signal line driver circuits into said signal lines, wherein said signal line driver circuits are commonly connected to each of said signal lines.

2. A device of claim 1 wherein said controlling means comprises transmission gates for enabling each signal line connected to each signal line driver circuit, said transmission gates being controlled in response to external signals so as to prevent different image signals from conflicting with each other on one signal line.

3. A device of claim 2 wherein said transmission gates are provided every signal lines of every signal line driver circuits.

4. The device of claim 1 wherein said signal line driver circuits comprise a first driver circuit and second driver circuit;

wherein said first and second driver circuit produce image signals having one polarity during one frame period, the polarities of said image signals being opposite to each other and being inverted every frame period.

5. The device of claim 3 wherein said transmission gates comprises first gates connected to signal lines of said first signal line driver circuits and second gates connected to signal lines of said second signal line driver circuit, wherein said first gate is enabled and said second gate is disabled when said external signal is a first level, and said first gate is disabled and said second gate is enabled when said external signal is a second level.

6. A device of claim 2 wherein said driver circuits and said transmission gate are made of thin film transistor, respectively.

7. An active matrix display device comprising:

a plurality of pixels arranged in rows and columns, each of said pixels provided with a thin film transistor;

a plurality of column lines and a plurality of row lines arranged in an orthogonal relation with each other, said pixels being located at each intersection of said column and row lines;

a first signal line driver circuit connected to said plurality of column lines at one end thereof, said first signal line driver circuit generating first image signals;

a second signal driver circuit connected to said plurality of column lines at the other end thereof, said second signal line driver circuit generating second image signals having an opposite polarity to said first image signals;

a scan line driver circuit connected to said plurality of row lines;

means for selectively applying either one of said first and second image signals to said column line from said first or second signal line driver circuits.

8. An active matrix display device comprising:

a plurality of pixels arranged in rows and columns, each of said pixels provided with a thin film transistor;

a plurality of column lines and a plurality of row lines arranged in an orthogonal relation with each other, said pixels being located at each intersection of said column and row lines;

a first signal line driver circuit connected to said plurality of column lines at one end thereof, said first signal line driver circuit generating first image signals;

a second signal line driver circuit connected to said plurality of column lines at the other end thereof, said second signal line driver circuit generating second image signals having an opposite polarity to said first image signals;

a scan line driver circuit connected to said plurality of row lines;

first switching means provided between said first signal line driver circuit and each of said column lines for switching said first image signals;

second switching means provided between said second signal line driver circuit and each of said column lines for switching said second image signals;

means for selectively activating one of said first and second switching means.

9. The active matrix display device of claim 8 wherein said first and second switching means comprise a transfer gate.

10. The active matrix display device of claim 8 wherein said first and second switching means are driven in synchronism with a gate clock.

11. An electro-optical display device comprising:

a plurality of pixels arranged in rows and columns, each of said pixels provided with a thin film transistor;

a plurality of column lines and a plurality of row lines arranged in an orthogonal relation with each other, said pixels being located at each intersection of said column and row lines;

a plurality of signal line driver circuits connected for supplying image signals to said pixels, said signal line driver circuits being commonly connected to each of said column lines;

a scanning line driver circuit connected with said plurality of row lines for switching said thin film transistor, wherein said image signals are not supplied to said column lines simultaneously from said plurality of signal line driver circuits.

12. The display device of claim 11 wherein each of said first and second signal line driver circuits has a selecting means for selecting one of first and second states, said first state being that image signals are supplied from the signal line driver circuit to said column lines; and said second state being that an impedance of said signal line driver circuit is high.

13. The display device of claim 12 wherein said selecting means comprises transfer gates.

14. The display device of claim 11 or 12 wherein said plurality of signal line driver circuits output image signals of different polarities.

supplying image signals to said column lines or for making an impedance of the signal line driver circuits high, means for controlling supply of image signals from said signal line driver circuits into said signal lines, wherein said signal line driver circuits are commonly connected to each of said signal lines.

* * * * *

UNITED STATES PATENT AND TRADEMARK OFFICE

CERTIFICATE OF CORRECTION

PATENT NO. : 5,654,733
DATED : August 5, 1997
INVENTOR(S) : Hidehiko Chimura et al.

It is certified that error appears in the above-identified patent and that said Letters Patent is hereby corrected as shown below:

Column 12,
Lines 58-64, after "14. The display device of claim 11 or 12 wherein said plurality of signal line driver circuits output image signals of different polarities."
delete [supplying image signals to said column lines or for making an impedance of the signal line driver circuits high.
means for controlling supply of image signals from said signal line driver circuits into said signal lines.
wherein said signal line driver circuits are commonly connected to each of said signal lines. ]

Signed and Sealed this

Ninth Day of July, 2002

*Attest:*

JAMES E. ROGAN

*Attesting Officer*

*Director of the United States Patent and Trademark Office*